Feb. 11, 1958 P. A. JENNINGS Re. 24,431
AGE-HARDENING AUSTENITIC STAINLESS STEEL
Original Filed Dec. 31, 1952
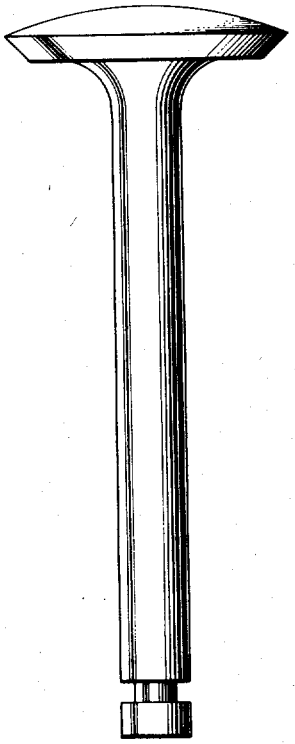
| | |
|---|---|
| Carbon | 0.08% to 1.50% |
| Chromium | 12% to 30% |
| Manganese | 7% to 20% |
| Nitrogen | 0.1% to 0.60% |
| Silicon | pref. not over 0.45% |
| Iron | remainder |
INVENTOR
PAUL A. JENNINGS
BY [signature]
HIS ATTORNEY United States Patent Office Re. 24,431
Reissued Feb. 11, 1958

24,431

AGE-HARDENING AUSTENITIC STAINLESS STEEL

Paul A. Jennings, Baltimore, Md., assignor to Armco Steel Corporation, a corporation of Ohio Original No. 2,698,785, dated January 4, 1955, Serial No. 328,882, December 31, 1952. Application for reissue February 20, 1957, Serial No. 641,793

8 Claims. (Cl. 75—126)

Matter enclosed in heavy brackets [ ] appears in the original patent but forms no part of this reissue specification; matter printed in italics indicates the additions made by reissue.

My application is a continuation in part of my co-pending application Serial No. 207,591, filed January 24, 1951, and entitled High Temperature Steel and Articles, now abandoned which application is a continuation-in-part of my U. S. Letters Patent 2,602,738 which issued on an application filed January 30, 1950, as a continuation-in-part of my then co-pending application, Serial No. 19,480, filed April 7, 1948, now Patent 2,495,731 of January 31, 1950, which is a continuation-in-part of my then co-pending application Serial No. 786,976, filed November 19, 1947, now abandoned, which in turn is a continuation-in-part of my application, Serial No. 762,863, filed July 23, 1947, also abandoned, and the invention relates to high temperature stainless steel, especially to articles in the form of valves, valve parts and other internal combustion engine components intended for use while hot in corrosive atmospheres.

Among the objects of my invention is the provision of strong, tough and durable stainless steel, and various internal combustion engine valves, and engine components fashioned of the same for elevated temperature use, which steel products function in a highly satisfactory manner in such fields as passenger car, truck, aircraft, diesel and marine vessel engine use, and which offer great hardness at the high temperatures encountered in such use and substantial resistance, in the heated condition, to hot corrosive atmospheres such as those containing the combustion products of anti-knock gasolines illustratively of the tetraethyl lead and lead bromide varieties.

Other objects of my invention in part will be obvious and in part pointed out more fully hereinafter.

The invention accordingly consists in the combination of elements, composition of materials and in the several products as described herein, the scope of the application of which is indicated in the following claims.

The single figure of the accompanying drawing represents a specific product and steel composition thereof falling within the scope of my invention.

As conductive to a clearer understanding of certain features of my invention, it may be noted at this point that a great variety of heretofore known valves and valve parts intended for use as operating components of internal combustion engines or the like have become obsolete for such reasons as increased engine temperatures incident to greater engine power and speed. In average passenger cars, for example, the temperatures encountered by the valves frequently are as high as 700 degrees F. or more at the fuel intake position, and as high as 1100 degrees F. to 1450 degrees F. or more at the exhaust position. These temperatures ordinarily are even higher in truck, bus, marine vessel, or aircraft engines, especially in the region where the exhaust valves operate.

Low-alloy steel valves, for example, which formerly operated satisfactorily in internal combustion engines now are found in most instances to be unacceptable, and particularly so on the exhaust side of these engines. The valves usually burn or warp very quickly at the high operating temperatures, thus impairing engine efficiency and requiring frequent replacement. While hot, the working parts commonly develop oxide scale which detrimentally affects proper seating. In turn, failure of the valve to seat properly allows leakage or blow-by of the hot gases, thus increasing the valve temperature and burning away the metal. An example of this type valve is one containing about 0.45% carbon, 8.50% chromium, 3.25% silicon, and the remainder substantially all iron.

Also, most of the low-alloy steel valves, including those having the composition just noted, are extremely susceptible to active corrosive attack by leaded fuels and particularly by the hot combustion products of these fuels. There are anti-knock fuels containing lead on the market, which, when consumed, not only exert a ruinous effect upon steel valves of low-alloy content, but a great majority of relatively high-alloy steel valves and parts likewise suffer great detriment and rapid deterioration when exposed to the fuel combustion products.

A number of stainless steel valves, and valves made of other high-alloy metal, for example, have been introduced for better serving present-day needs. Some of these are of ferritic grade steel. Others are martensitic. In some, there is a high-silicon content and, as a result, they enjoy adequate scaling resistance. Unfortunately, however, they have poor resistance to lead compounds and are decidedly inferior in matters of hot-hardness and stretch resistance under certain operating conditions.

There are still other valves in the prior art, these being of austenitic chromium-nickel stainless steel grade. The amounts of silicon in the conventional austenitic steel products range from about 0.50% to 4.0% or more. In general, the austenitic steel valves have a more favorable lattice structure for resisting stress-rupture and creep at elevated temperatures than do the ferritic or martensitic products. It is also true that the relatively high-alloy content of the chromium-nickel austenitic steel favors resistance to scaling from heat at engine temperatures. A further advantage often arising from austenitic steel valve products is their freedom from phase transformation and, in this respect, freedom from volume changes and any resulting tendencies such as warping, sticking or cracking during the heating and cooling cycles brought about by the heat engine and its operation. The many valves of this character in the prior art, however, leave much to be desired of resistance to corrosive attack by hot lead compounds.

An outstanding object of my invention, accordingly, is the provision of a high temperature heat-resistant, corrosion-resistant stainless steel and various valves, valve parts and internal combustion engine components fashioned of the same having substantial strength at the temperatures of use, which are substantially free of phase transformation, are hot hard, resist stretch, and efficiently and reliably resist oxidation in the presence of heat and leaded fuel combustion products.

Referring now more particularly to the practice of my invention, I provide low-silicon, high-nitrogen austenitic chromium-manganese stainless steel internal combustion engine valves, valve parts, and various other internal combustion engine components made of the steel, illustratively valves, stems, heads, springs, casings, claddings, linings or surfacings. In preferred composition, my products include about 0.08% to 1.50% carbon, from 12% to 30% chromium, less than about 2% nickel, amounts of manganese ranging from 5% to 20%, with the silicon content not exceeding 0.45%, with nitrogen from 0.06% to 0.60%, and the remainder substantially all iron. Moreover, the sum of the nitrogen and carbon contents amounts to at least 0.40%. And the relative amounts of carbon, chromium, nickel, manganese and nitrogen are such as to yield a substantially fully austenitic structure.

Preferably, for desired hardness at the high temperatures encountered in actual use, the carbon content amounts to some 0.40% to 1.50% and the nitrogen from 0.20% to 0.55%.

By maintaining a substantial manganese content and the silicon content below about the 0.25% figure, I find sharp improvement in resistance of the steel products to corrosion and attack by products by combustion resulting from the burning of leaded fuel. At about 0.15% silicon and on down to 0.10% or less, this improvement is even more pronounced, and the hot-hardness is not adversely affected. Both the hot-hardness and corrosion-resistance are even more favorable where the carbon exceeds about 0.40% and the silicon ranges from about 0.15% on down substantially to zero in amount. The smaller quantities of silicon accordingly are usually preferred.

The inclusion of manganese results from my discovery that nickel in steels of the stainless grade often has an adverse effect upon the corrosion resistance of valve products while the latter operate in the presence of hot lead compounds. By supplanting the nickel ordinarily required for providing a steel of austenitic quality with manganese an austenitic balance steel is had and the adverse effect of nickel upon corrosion resistance in the combustion products of leaded fuels is importantly dispelled. Moreover, it seems that the steel of high manganese content has a greater solubility for carbon and as such permits greater hot hardness as higher temperatures are achieved. Additionally it has a much greater solubility for nitrogen.

In my steel I use the element nitrogen in amounts from 0.06% up to about 0.30% or 0.40%, or even up to about 0.60%, as a substitute for an equivalent amount of nickel in the steel, in which event the carbon content may be as low as 0.08%. The nitrogen serves the function of increasing the hot-hardness of the steel. And as previously noted it also serves as a partial substitute for other austenite-forming elements to maintain the austenitic balance.

There are occasions where my stainless steel products include in the alloy composition thereof, as for special purposes, one or more such elements as molybdenum, titanium, columbium, tungsten, vanadium, copper, cobalt, tantalum, aluminum, zirconium, or the like, ranging from quite small amounts to substantial amounts not inconsistent with properties desired.

The stainless steel valves, valve parts and engine components which I provide have a sulphur content which may be some quantity below about 0.04%, or even as much as 0.2% or more. The larger quantities of sulphur, and especially those between about 0.15% to 0.20%, contribute to the effect of the low-silicon content in promoting resistance to attack by the combustion products of leaded gasolines and the like. The larger quantities of sulphur, say those beyond about 0.04%, and especially from 0.04% to 0.15%, usually improve the machining properties of the steel. Amounts of sulphur much beyond 0.20% often introduce hot working difficulties with certain of the austenitic steels which I employ; also, the rate of improvement of resistance to lead oxide corrosion usually decreases for these greater amounts. The phosphorus content of my products preferably is below about 0.04%.

The particular amounts of such elements as chromium, manganese and nitrogen present in the internal combustion engine products which I provide assure excellent heat resistance and resistance to oxidation at the high temperatures encountered. Also, the inclusion of nitrogen and the restriction of silicon to the critically small amounts indicated, contribute to corrosion-resistance of the products, in the combustion products of leaded fuels, as where the steel takes the form of an exhaust valve or part exposed to aircraft, truck or passenger car engine exhaust gases. By virtue of the austenitic quality of the steel, my valve products suffer substantially no phase transformation during heating and cooling cycles and, accordingly, are free of volume changes and difficulties often following upon change of phase. The valves are strong, tough and hot hard at the high temperatures encountered. They resist scaling, warping and cracking at full temperature and upon being cooled and reheated.

The effect of the nitrogen addition upon hot-hardness is demonstrated by the comparative figures given in Table I below. The samples analyze approximately 21% chromium, 9% manganese, nickel up to about 2%, 0.10% silicon, .50% carbon, with varying nitrogen contents and remainder iron. All samples were heated at about 2150 degrees F. for one hour, then water-quenched, and finally aged at a temperature of about 1350 degrees F. to 1400 degrees F. The hot-hardness tests were made with a cold ball penetrator at 1400 degrees F. and are reported in Brinell numbers. The corrosion tests were made by immersing the samples in molten lead oxy-bromide contained in a new magnesia crucible at a temperature of 1550 degrees F. for one hour, the weight loss being reported in grams per square decimeter.

TABLE I

Influence of nitrogen on hot-hardness and resistance to lead oxy-bromide of chromium-manganese stainless steel

| Sample | C | Mn | Cr | Si | Ni | N | Hot hardness, 1,400° F. | Weight loss |
|---|---|---|---|---|---|---|---|---|
| 6374 | 0.546 | 8.74 | 21.02 | 0.10 | 0.12 | 0.30 | 155 | 10.18 |
| 6389 | .498 | 9.08 | 21.09 | .09 | 1.34 | .31 | 152 | 17.60 |
| 6492 | .596 | 9.20 | 21.21 | .08 | .12 | .40 | 185 | 4.59 |
| 6493 | .564 | 9.20 | 20.81 | .09 | 2.06 | .40 | 180 | 12.07 |

In Table I it is noted that with nitrogen in the amount of 0.30% (sample 6374) a hardness of 155 Brinell is had but with 0.40% (sample 6492) this amounts to 185. Also it is noted that the weight loss in molten lead oxy-bromide decreases from 10.18 grams per square decimeter per hour to 4.59. As a further point it is observed that with an increase in nickel content (sample 6389 as compared with 6374) there is a slight loss of hot-hardness (152 Brinell as compared with 155) and a substantial loss in resistance to molten lead oxy-bromide (17.60 grams per square decimeter per hour weight loss as compared to 10.18).

The effect of nitrogen as a substitute for nickel is especially emphasized by hardness tests taken at various high temperatures and illustrated in Table II given below, where two samples of a 21% chromium, 9% manganese stainless steel are presented, one being of low nitrogen and high nickel content, another of low nickel and high nitrogen content. In both cases the samples were annealed at 2150 degrees F. for one hour and then water-quenched followed by aging at 1350 degrees F. for nine hours and water-quenched. Here as before, the hot-hardness tests were taken with a cold ball penetrator and reported in Brinell and as to the corrosion tests were made in molten lead oxy-bromide at 1550 degrees F. for one hour and the weight loss reported in grams per square decimeter per hour. Additional corrosion tests were made at a temperature of 1675 degrees in molten lead oxide contained in magnesia crucible, the weight loss being similarly reported.

TABLE II(a)

Influence of nitrogen on hot-hardness at various temperatures, analysis of samples

| Heat | C | Mn | P | S | Si | Cr | Ni | N |
|---|---|---|---|---|---|---|---|---|
| 49369 | 0.614 | 9.34 | 0.029 | 0.008 | 0.06 | 21.43 | 4.00 | 0.05 |
| 6492 | .596 | 9.20 | .013 | .015 | .08 | 21.21 | .12 | .40 |

TABLE II(b)

Properties

| Heat | Room temp. Rockwell C) | Hot hardness (Brinell) at— | | | Lead oxybromide | Lead oxide magnesia crucible |
|---|---|---|---|---|---|---|
| | | 1,400° F. | 1,500° F. | 1,600° F. | | |
| 49369 | 29.7 | 145 | 131 | 115 | 15.80 | 19.45 |
| 6492 | 35.8 | 185 | 175 | 161 | 4.59 | 38.35 |

From the above it will be seen that the example having a nitrogen content of 0.40% (sample 6492) is substantially harder at the respective temperatures of 1400 degrees F., 1500 degrees F. and 1600 degrees F. than the example with the low nitrogen content but with a 4.0% nickel content (sample 49369). Also it will be seen that there is much less corrosive attack by molten lead oxybromide, although somewhat greater attack by the molten lead oxide.

Certain further benefits are had by the inclusion in my stainless steel of molybdenum in amounts up to about 9%; generally satisfactory results are had with molybdenum amounting to about 2% to 5%. The particular beneficial effects on hot hardness are illustrated by the results given in Table III below in which, for a 21% chromium, 9% manganese stainless steel with about 0.60% carbon and 0.30% nitrogen, various hardness figures are given for samples of differing molybdenum contents. In each case the sample was heated to about 2150 degrees F. for one hour, then water-quenched and finally aged at a temperature of about 1350 degrees F. to 1400 degrees F. And, as before the hot-hardness tests were made with a cold ball penetrator at 1400 degrees F. and reported in Brinell numbers. The corrosion tests likewise were made by immersing the samples in molten lead oxy-bromide contained in a magnesia crucible at a temperature of 1550 degrees F. for one hour and the weight loss reported in grams per square decimeter per hour.

TABLE III

Influence of molybdenum on hot-hardness and resistance to lead oxy-bromide of chromium-manganese-nitrogen stainless steel

| Sample | C | Mn | Si | Cr | Ni | Mo | N | Hot hardness, 1,400° F. | Lead oxybromide |
|---|---|---|---|---|---|---|---|---|---|
| 6433-1 | 0.583 | 9.12 | 0.10 | 21.44 | 0.10 | 1.05 | 0.33 | 190 | 2.04 |
| 6533-2 | .590 | 8.97 | .10 | 21.16 | .10 | 1.99 | .33 | 202 | 2.82 |
| 6533-3 | .633 | 8.49 | .13 | 19.65 | .10 | 3.10 | .32 | 236 | 3.14 |
| 6534-1 | .581 | 9.16 | .09 | 21.18 | .03 | 4.06 | .34 | 225 | 3.01 |
| 6534-2 | .604 | 8.88 | .11 | 20.84 | .02 | 5.62 | .32 | 240 | 1.85 |

Thus it will be seen that in this invention there is provided a low-silicon high-nitrogen austenitic chromium-manganese stainless steel and various high temperature articles and products fashioned of the same, in which the various objects noted hereinbefore together with many thoroughly practical advantages are successfully achieved. It will be seen that the products are well suited for resisting corrosion in the presence of combustion products of leaded fuels.

While certain of the articles which I provide take the form of internal combustion engine valves, valve parts and other internal combustion engine components, it will be understood that certain advantages of the invention are had with other products of the low-silicon steel, among which are high-temperature gas turbine nozzles, turbine parts adjacent to the nozzle, and any of a variety of supercharger components.

While all the benefits of my invention are enjoyed in the steel articles described above, certain of these benefits, including great hardness at high temperatures, are enjoyed even where the silicon content of the steel is not restricted to the maximum figure of 0.45% but is included in amounts up to 4.0% or even more.

As many possible embodiments may be made of my invention and as many changes may be made in the embodiment hereinbefore set forth, it will be understood that all matter described herein is to be interpreted as illustrative and not as a limitation.

I claim as my invention:

1. Age-hardening austenitic stainless steel having a hardness when aged exceeding 145 Brinell at a temperature of 1400° F. and containing about 0.08% to [1.50%] *1.00%* carbon, 12% to 30% chromium, 7% to 20% manganese, [.1%] *.30%* to 0.60% nitrogen, *silicon up to 4.0%*, with the sum of the carbon and nitrogen contents at least 0.40%, and with the various elements all in such proportions as to assure a substantially fully austenitic structure, and the remainder substantially all iron.

2. Age-hardening austenitic stainless steel having a hardness when aged exceeding 145 Brinell at a temperature of 1400° F., and containing about 0.08% to 1% carbon, 19% to 23% chromium, 7% to 11% manganese, molybdenum up to 9%, [.1%] *.30%* to .60% nitrogen, *silicon up to 4.0%*, with the sum of the carbon and nitrogen contents at least 0.40%, and the remainder substantially all iron.

3. Age-hardening austenitic stainless steel having a hardness exceeding 145 Brinell at a temperature of 1400 degrees F. and substantial resistance to corrosion in the presence of leaded fuel combustion products, and containing about .08% to .7% carbon, 19% to 23% chromium, 7% to 11% manganese, 0.20% to 0.55% nitrogen, incidental amounts of nickel, silicon not exceeding 0.25%, with the sum of carbon and nitrogen contents at least 0.40%, and the remainder substantially all iron.

4. Age-hardening austenitic stainless steel having a hardness exceeding 145 Brinell at a temperature of 1400 degrees F. and substantial resistance to corrosion in the presence of leaded fuel combustion products, and containing about .08% to .7% carbon, 19% to 23% chromium, 7% to 11% manganese, 2% to 5% molybdenum, .1% to .4% nitrogen, silicon not exceeding 0.25%, with the sum of the carbon and nitrogen contents at least 0.40%, and the remainder substantially all iron.

5. Age-hardening austenitic stainless steel having a hardness exceeding 145 Brinell at a temperature of 1400 degrees F. and substantial resistance to corrosion in the presence of leaded fuel combustion products, and containing about .08% to 1% carbon, 19% to 23% chrorium, 7% to 11% manganese, nickel less than 2%, sulphur up to 0.15%, molybdenum up to 9%, [.1%] *.30%* to .60% nitrogen, silicon not exceeding 0.45%, with the sum of the carbon and nitrogen contents at least 0.40%, and the remainder substantially all iron.

6. Age-hardening austenitic stainless steel internal combustion engine exhaust valves comprising approximately .08% to .7% carbon, 19% to 23% chromium, 7% to 11% manganese, .2% to .55% nitrogen, with the sum of the carbon and nitrogen contents at least about 0.40%, *silicon up to 4.0%*, and the remainder substantially all iron.

7. Age-hardening austenitic stainless steel internal combustion engine exhaust valves comprising approximately .08% to .7% carbon, 19% to 23% chromium, 7% to 11% manganese, .1% to .60% nitrogen, molybdenum up to 5%, nickel less than 2%, sulphur up to 0.15%, silicon not exceeding 0.45%, with the sum of the carbon and nitrogen contents at least about 0.40%, and the remainder substantially all iron.

*8. Age-hardening austenitic stainless steel having a hardness exceeding 145 Brinell at a temperature of 1400° F., and containing about .08% to .7% carbon, 19% to 23% chromium, 7% to 11% manganese, .20% to 0.55% nitrogen, silicon up to 4.0%, with the sum of the carbon and nitrogen contents at least 0.40%, and the remainder substantially all iron.*

References Cited in the file of this patent or the original patent

UNITED STATES PATENTS

| | | |
|---|---|---|
| 2,212,495 | De Vries | Aug. 27, 1940 |
| 2,380,854 | Lorig | July 31, 1945 |
| 2,496,247 | Jennings | Jan. 31, 1950 |

FOREIGN PATENTS

| | | |
|---|---|---|
| 202,283 | Switzerland | June 1, 1939 |

OTHER REFERENCES

Archiv fur Das Eisenhuttenwesen, vol. 15, 1942, pp. 467 to 472.